(12) United States Patent
Danis et al.

(10) Patent No.: US 11,585,241 B2
(45) Date of Patent: Feb. 21, 2023

(54) ASSEMBLY FOR A TURBOMACHINE TURBINE AND ASSOCIATED TURBOMACHINE

(71) Applicant: SAFRAN AIRCRAFT ENGINES, Paris (FR)

(72) Inventors: Antoine Claude Michel Etienne Danis, Moissy-Cramayel (FR); Clément Jarrossay, Moissy-Cramayel (FR); Lucien Henri Jacques Quennehen, Moissy-Cramayel (FR); Nicolas Paul Tableau, Moissy-Cramayel (FR); Hubert Jean-Yves Illand, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/279,286

(22) PCT Filed: Sep. 24, 2019

(86) PCT No.: PCT/FR2019/052234
§ 371 (c)(1),
(2) Date: Mar. 24, 2021

(87) PCT Pub. No.: WO2020/065199
PCT Pub. Date: Apr. 2, 2020

(65) Prior Publication Data
US 2022/0049626 A1 Feb. 17, 2022

(30) Foreign Application Priority Data

Sep. 25, 2018 (FR) ...................... 1858713

(51) Int. Cl.
*F01D 25/24* (2006.01)
*F01D 11/08* (2006.01)
(Continued)

(52) U.S. Cl.
CPC ............ *F01D 25/243* (2013.01); *F01D 11/08* (2013.01); *F01D 25/246* (2013.01); *F16B 23/00* (2013.01);
(Continued)

(58) Field of Classification Search
CPC .. F01D 25/246; F01D 25/243; F05D 2260/31; F05D 2230/644
See application file for complete search history.

(56) References Cited

U.S. PATENT DOCUMENTS 1,753,154 A 4/1930 Martus
5,224,825 A * 7/1993 Strang ................... F01D 25/246
415/189

(Continued)

FOREIGN PATENT DOCUMENTS

CN 105189937 A 12/2015
CN 108138576 A 6/2018
(Continued)

OTHER PUBLICATIONS

FR 3064022 English Specification, Espacenet (Year: 2018).*
FR 3049003 English Specification, Espacenet (Year: 2017).*
International Search Report as issued in International Patent Application No. PCT/FR2019/052234, dated Jan. 23, 2020.

*Primary Examiner* — Courtney D Heinle
*Assistant Examiner* — John S Hunter, Jr.
(74) *Attorney, Agent, or Firm* — Pillsbury Winthrop Shaw Pittman LLP

(57) ABSTRACT

An assembly for a turbomachine turbine includes at least one ring sector made of CMC material and a support casing including an upstream flange and a downstream flange between which each ring sector is disposed, each ring sector including a base that has a radially external face from which radially extend two lugs, the lugs of each ring sector being retained between the two flanges of the support casing by axial pins each engaged in one of the flanges of the ring
(Continued)

support casing and in the lug of the ring sector facing said flange, the assembly further including, for each ring sector, at least one radial retaining pin screwed into the support casing and coming to radially bear against a lug of the at least one ring sector to retain it in position, and anti-rotation system for rotationally locking the radial retaining pin.

8 Claims, 3 Drawing Sheets

(51) Int. Cl.
    *F16B 23/00* (2006.01)
    *F16B 35/00* (2006.01)
    *F16B 39/06* (2006.01)

(52) U.S. Cl.
    CPC .............. *F16B 35/00* (2013.01); *F16B 39/06* (2013.01); *F05D 2220/32* (2013.01); *F05D 2230/644* (2013.01); *F05D 2240/11* (2013.01); *F05D 2240/14* (2013.01); *F05D 2260/31* (2013.01); *F05D 2300/6033* (2013.01)

(56) References Cited

U.S. PATENT DOCUMENTS

| | | | |
|---|---|---|---|
| 7,883,308 B2 * | 2/2011 | Hung | .................... F16B 35/005 |
| | | | 411/405 |
| 10,655,501 B2 * | 5/2020 | Lepretre | ............... F01D 25/243 |
| 11,021,988 B2 * | 6/2021 | Tableau | .................... F23R 3/60 |
| 2012/0027572 A1 | 2/2012 | Denece et al. | |
| 2015/0044043 A1 * | 2/2015 | Swan | .................... F16B 41/002 |
| | | | 415/214.1 |
| 2016/0024926 A1 | 1/2016 | Jaureguiberry et al. | |
| 2019/0040758 A1 | 2/2019 | Quennehen et al. | |
| 2021/0115806 A1 | 4/2021 | Tableau et al. | |

FOREIGN PATENT DOCUMENTS

| | | | | |
|---|---|---|---|---|
| FR | 3049003 A1 * | 9/2017 | .............. | F01D 11/08 |
| FR | 3 064 022 A1 | 9/2018 | | |
| FR | 3 064 024 A1 | 9/2018 | | |
| FR | 3064022 A1 * | 9/2018 | ............ | F01D 11/005 |
| WO | WO 2006/136755 A2 | 12/2006 | | |

* cited by examiner

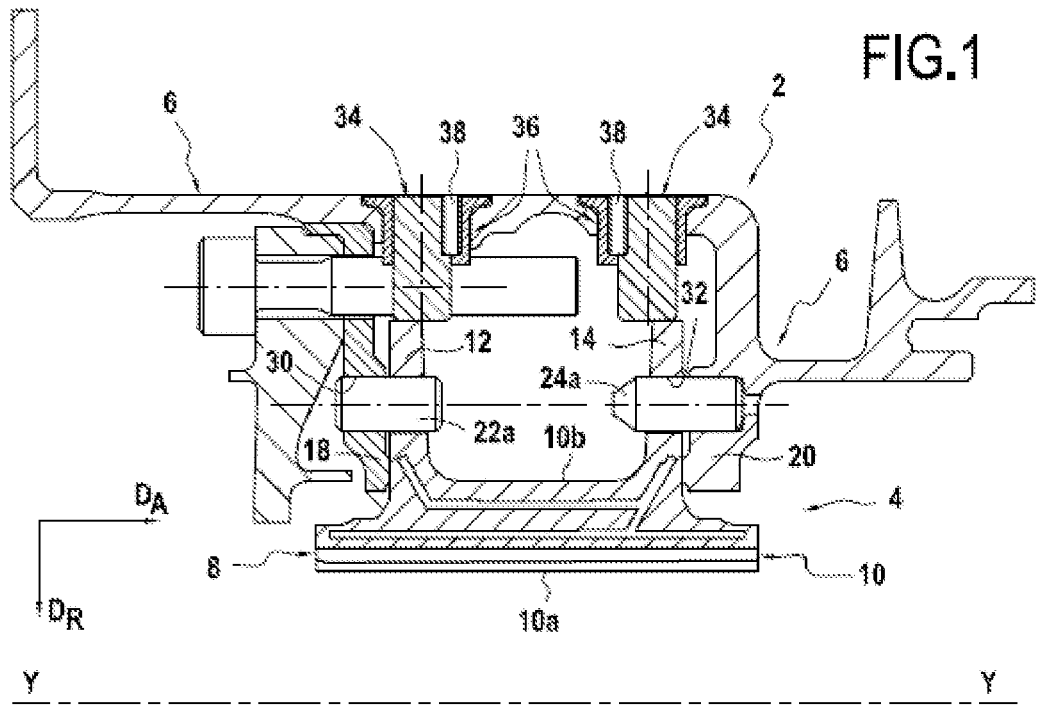
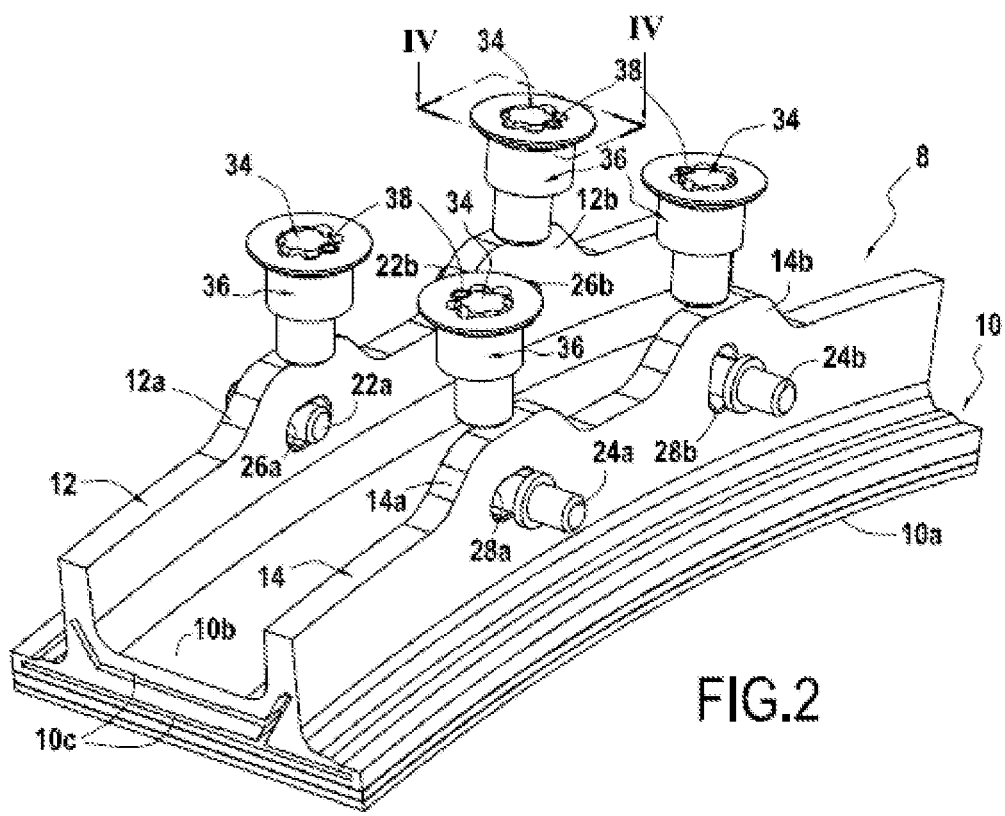

ASSEMBLY FOR A TURBOMACHINE TURBINE AND ASSOCIATED TURBOMACHINE

CROSS-REFERENCE TO RELATED APPLICATIONS

This application is the U.S. National Stage of PCT/FR2019/052234, filed Sep. 24, 2019, which in turn claims priority to French patent application number 1858713 filed Sep. 25, 2018. The content of these applications are incorporated herein by reference in their entireties.

BACKGROUND OF THE INVENTION

This invention relates to the general field of aeronautical turbomachines. However, this invention could also be applied to any other gas turbine engine.

Ceramic Matrix Composite, or CMC, materials are known for retaining their mechanical properties at high temperatures, which makes them able to be used for making hot structural parts.

In aeronautical gas turbine engines, the improvement of efficiency and the reduction of certain contaminant emissions mean that operation at ever higher temperatures is desired. In the case of all-metal turbine rings, it is necessary to cool all the parts of the assembly and in particular the turbine ring that is subject to very hot flows, typically greater than the temperature that can be withstood by the metallic material. This cooling has a significant impact on the performance of the engine since the cooling flow used is bled from the main flow of the engine. Furthermore, the use of metal for the turbine ring limits the possibilities for increasing the temperature at the level of the turbine, which could however make it possible to improve the performance of aeronautical engines.

Moreover, a metallic turbine ring assembly becomes distorted under the effect of the thermal flows, which modifies the plays at the level of the flow duct and, consequently, the performance of the turbine.

This is why the use of CMC for various hot parts of the engines has already been envisioned, especially as CMCs have the additional advantage of having a lower density than that of the heat-resistant metals conventionally used.

Thus, the production of sectors of turbine ring out of a single CMC part is particularly described in the document US 2012/0027572. The ring sectors include a base, the radially internal face of which is intended to delimit a gas duct of the turbomachine and a radially external face from which radially extend two lugs, the ends of which are retained between the two flanges of a metallic ring support structure.

The use of CMC ring sectors thus makes it possible to significantly reduce the ventilation needed for the cooling of the turbine ring. However, the CMC having different mechanical behavior from a metallic material, its integration and the way of positioning it within the turbine have had to be redesigned. Specifically, CMC does not withstand interference-fitted assembly (usually used for metallic rings) and its thermal expansion is lower than a metallic material. Thus, to solve this problem, it is known to retain the lugs of the ring sectors using axial pins each engaged in one of the clamps of the ring support structure.

However, this type of assembly has the drawback that a radial play remains in the holes of the ring sector lugs provided for the passage of the axial pins, this play being able to cause a radial movement of the ring within the turbine. However, such a movement directly manifests as a variation of the play at the blade tip, and therefore as a direct impact on the engine performance.

SUBJECT AND SUMMARY OF THE INVENTION

This invention thus has the main aim of making provision for an assembly for a turbine that does not have such drawbacks.

This aim is achieved owing to an assembly for a turbomachine turbine extending about an axis, comprising at least one angular ring sector made of ceramic matrix composite material and a support casing disposed around the at least one ring sector, the support casing comprising two flanges, respectively an upstream flange and a downstream flange, between which each ring sector is disposed, each ring sector comprising a base that has a radially internal face and a radially external face from which radially extend two lugs, the lugs of each ring sector being retained between the two flanges of the support casing by axial pins each engaged in one of the flanges of the ring support casing and in the lug of the ring sector facing said flange, the assembly further comprising, in accordance with the invention, for each ring sector, at least one radial retaining pin screwed into the support casing and coming to radially bear against a lug of the at least one ring sector to retain the ring sector in position, and anti-rotation means for rotationally locking the at least one radial retaining pin.

The assembly according to the invention is noteworthy in that it proposes to employ radial retaining pins that come into direct contact with the lugs of the ring sectors to retain the ring in position and thus avoid any radial movement thereof within the turbine. Moreover, these radial retaining pins are screwed into the support casing, which gives them an adjustable position to take up the residual radial play at the level of the axial pins. Furthermore, the assembly according to the invention comprises anti-rotation means for rotationally locking the radial retaining pins, which avoids the pins loosening. Finally, the radial retaining pins of the assembly are removable.

Preferably, each radial retaining pin is screwed into a bush fitted in a support casing. This bush constitutes an intermediate part for receiving the radial retaining pin without having to use a weld.

In this case, each radial retaining pin is advantageously rotationally locked inside the bush by a radially-inserted split pin, which is disposed between the radial retaining pin and the bush. Thus, the bush accommodates the radial retaining pin and split pin, which makes the overall solution removable and repairable.

In this case, each radial retaining pin can comprise at its periphery at least one blind drill hole, which preferably comprises a tapped hole, extending in the longitudinal direction of the radial retaining pin to make it possible to insert the split pin between the radial retaining pin and the bush.

Similarly, each radial retaining pin can comprise at its periphery a plurality of blind drill holes regularly distributed about a longitudinal axis of the radial retaining pin.

Still in this case, each bush can comprise a threaded bore for receiving the radial retaining pin, the bore of the bush being provided with at least one tapped hole extending in the longitudinal direction of the bush to make it possible to screw the radial retaining pin.

For each ring sector, the two lugs are preferably each retained between the two flanges of the support casing by two axial pins circumferentially offset from one another, and with each axial pin is preferably associated a radial retaining pin coming to radially bear against the corresponding lug of the ring sector plumb with the axial pin.

Each radial retaining pin can comprise a hexagon head recess to allow it to be screwed into the corresponding bush. Each bush can be fitted in the support casing and retained therein by interference fitting.

Another subject of the invention is a turbomachine comprising an assembly as previously defined.

BRIEF DESCRIPTION OF THE DRAWINGS

Other features and advantages of this invention will become apparent from the description given below, with reference to the appended drawings which illustrate an exemplary embodiment thereof devoid of any limitation. In the figures:

FIG. 1 is a longitudinal section view of a turbine ring assembly according to the invention;

FIG. 2 is an exploded perspective view showing the assembly of a turbine sector according to the invention;

DETAILED DESCRIPTION OF THE INVENTION

Figure 3:
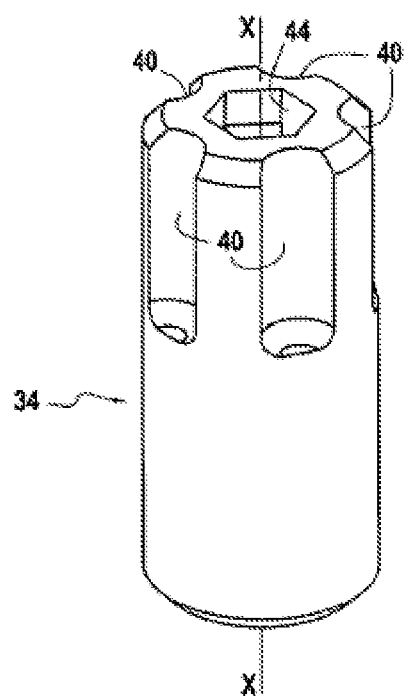
FIG. 3 is a perspective view of a radial retaining pin of the turbine ring assembly according to the invention.

FIG. 1 represents, in longitudinal section view, a turbine assembly 2 extending about an axis Y-Y according to the invention.

This assembly 2 particularly comprises a turbine ring 4 made of Ceramic Matrix Composite (CMC) material and a support casing 6 of the metallic ring. The turbine ring 4 surrounds a set of rotary blades (not represented).

Moreover, the turbine ring 4 is formed of a plurality of ring sectors 8 which are placed circumferentially end to end to form a ring. In FIG. 1, the arrow $D_A$ indicates the axial direction of the turbine ring whereas the arrow $D_R$ indicates the radial direction of the turbine ring.

As represented more precisely on FIG. 2, each ring sector 8 has a substantially inverted Pi (or π) shape with a part 10 forming a base.

This part 10 forming a base is provided with a radially internal face 10a which is intended to delimit a gas duct and which is typically provided with a layer of abradable coating (not represented in the figures).

Two lugs—namely an upstream lug 12 and a downstream lug 14—radially extend from the radially external face 10b of the part 10 forming the base. These lugs 12, 14 extend over the whole width of the ring sector 8 (in the circumferential direction).

As represented in FIG. 1, the support casing 6 can be an integral part of a turbine casing and is positioned around the turbine ring. The support casing can alternatively be joined onto the turbine casing to form a single part. It comprises an upstream annular flange 18 and a downstream annular flange 20 which extend radially inwards.

The lugs 12, 14 of each ring sector 8 are fitted pre-loaded between the respective annular flanges 18, 20 of the ring support structure.

Moreover, the ring sectors are retained by axial locking pins. More precisely, the respective lugs of the latter are retained between the two flanges of the support casing by axial pins 22a, 24a which are circumferentially offset with respect to one another.

As represented in FIG. 2, the upstream lug 12 of each ring sector 8 is provided, at the level of two radial bulges 12a, 12b, with two axial holes 26a, 26b circumferentially offset with respect to one another and able to be each traversed by an axial locking pin 22a, 22b.

Similarly, the downstream lug 14 of each ring sector 8 is provided, at the level of two radial bulges 14a, 14b, with two axial holes 28a, 28b circumferentially offset with respect to one another and able to be each traversed by an axial locking pin 24a, 24b.

Moreover, the upstream flange 18 of the support casing 6 comprises a plurality of axial holes 30 circumferentially offset with respect to one another. Similarly, the downstream flange 20 comprises a plurality of axial holes 32 circumferentially offset with respect to one another. These holes 30, 32 are intended to be traversed by an axial locking pin 22a, 22b, 24a, 24b.

Furthermore, the inter-sector sealing is provided by sealing tabs (not shown in the figures) housed in grooves 10c facing one another in the faces circumferentially facing two ring sectors 8 placed end to end circumferentially.

Each ring sector 8 described above is made of a Ceramic Matrix Composite (CMC) material by formation a fiber preform having a similar shape to that of the ring sector and densification of the ring sector with a ceramic matrix.

For the production of the fiber preform, it is possible to use ceramic fiber filaments, for example SiC fiber filaments such as those sold by the Japanese company Nippon Carbon under the name NICALON™ (which is a silicon carbide continuous fiber that possesses high strength, heat and corrosion resistance even in a high temperature air atmosphere over one thousand degree), or carbon fiber filaments.

The fiber preform is advantageously made by three-dimensional weaving, or multi-layer weaving with fashioning of unbinding areas making it possible to move apart the preform parts corresponding to the lugs 12 and 14 of the ring sectors.

The weaving can be of interlock type. Other three-dimensional or multi-layer weaves can be used such as for example multi-canvas or multi-satin weaves. The reader is for example referred to the document WO 2006/136755.

After weaving, the blank can be shaped to obtain a ring sector preform which is consolidated and densified with a ceramic matrix, the densification being able to be done, in particular, by Chemical Vapor Infiltration (CVI) which is well-known, per se.

A detailed example of the manufacturing of CMC ring sectors is in particular described in the document US 2012/0027572.

The ring support structure 6 meanwhile is made of a metallic material such as a Waspaloy® alloy or known by the name of INCONEL® alloy 718 (which is a high-strength, corrosion-resistant nickel chromium material used at −423° to 1300° F.).

According to the invention, provision is made, for each ring sector 8, for at least one radial retaining pin screwed into the support casing 6 and coming to bear against each lug of the ring sector to retain the turbine ring in position, as well as means for rotationally locking these radial retaining pins.

As represented in FIGS. 1 and 2, with each axial locking pin 22a, 22b, 24a, 24b is associated a radial retaining pin 34 coming to radially bear against the corresponding lug of the ring sector plumb with the axial pin.

More precisely, the retaining pins 34 come to radially bear against one of the radial bulges 12a, 12b of the upstream lug 12 of the ring sector and against one of the radial bulges 14a, 14b of the downstream lug 14 of said ring sector.

This radial bearing makes it possible to reduce the radial play remaining in the holes 26a, 26b, 28a, 28b of the lugs of the ring sector, and thus to avoid any radial movement of the ring sector.

Each retaining pin 34 is screwed into a bush 36 itself fitted in the support casing 6 and retained therein for example by interference fitting. For this purpose, each bush 36 comprises a bore 36a which is threaded along its entire height (the threading is not represented in the figures).

In addition, it is proposed that each radial retaining pin 34 is rotationally locked inside the corresponding bush 36 by a split pin 38 that is radially inserted into the bush between the radial retaining pin and the bush.

Figure 4:
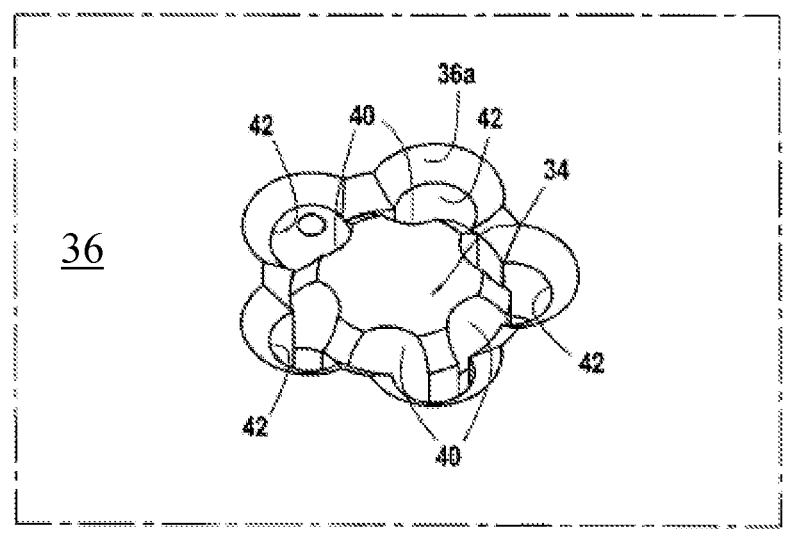
FIG. 4 shows an example of rotational locking according to the invention of the radial retaining pin of FIG. 3 in section IV-IV, and FIG. 5 schematically represents a turbomachine comprising a turbine assembly.

For this purpose, and as represented in more detail in FIGS. 3 and 4, each radial retaining pin 34 comprises, at its outer periphery, at least one tapped hole, 40 which extends in the longitudinal direction of the radial retaining pin (i.e. along its longitudinal axis X-X) over at least a part of its height.

Preferably, provision is made for a plurality of tapped holes 40 which are regularly distributed about the longitudinal axis X-X of each radial retaining pin 34. Thus, in the example of FIGS. 3 and 4, these tapped holes are six in number.

In the same way, and in a complementary manner, the threaded bore 36a of each bush is equipped with at least one tapped hole 42 extending in the longitudinal direction of the bush.

The tapped holes 40 of the radial retaining pins and the tapped holes 42 of the bushes 36 form cut-outs which substantially correspond to the size of the split pins 38 in order to make it possible to insert the latter between the radial retaining pins and the bushes. When the split pins are inserted, they prevent the radial retaining pins from turning about their longitudinal axis X-X and thus rotationally lock them.

It will be noted that as represented in FIG. 3, each radial retaining pin 34 may comprise a hexagon head recess 44 to allow it to be screwed into the bore of the corresponding bush.

Figure 5:
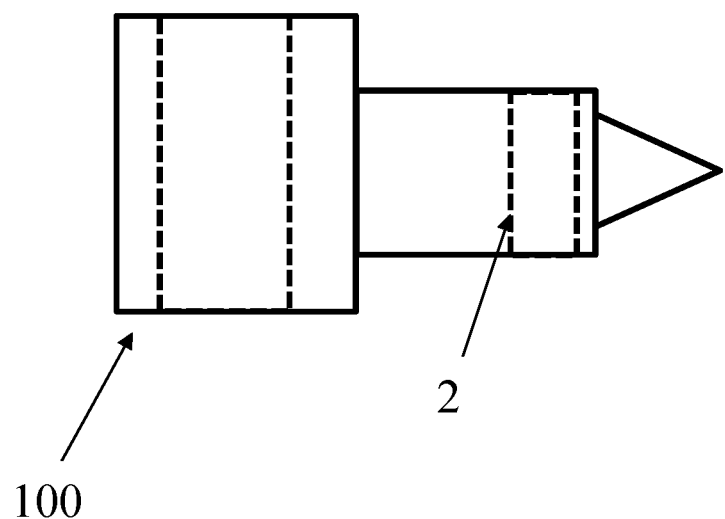

FIG. 5 schematically represents a turbomachine 100 comprising a turbine assembly 2.

The invention claimed is:

1. An assembly for a turbomachine turbine extending about an axis, the assembly comprising:
    at least one ring sector of a turbine ring, the at least ring sector made of ceramic matrix composite material, and
    a support casing disposed around the at least one ring sector, the support casing comprising two flanges, respectively an upstream flange and a downstream flange, between which each ring sector of the at least one ring sector is disposed, each ring sector of the at least one ring sector comprising a base that has a radially internal face and a radially external face from which radially extend two lugs, the two lugs of each ring sector of the at least one ring sector being retained between the two flanges of the support casing by axial pins, wherein each axial pin is engaged in one of the two flanges of the ring support casing and in the lug of the ring sector of the at least one ring sector facing the one of the two flanges,
    wherein the assembly further comprises, for each ring sector of the at least one ring sector, at least one radial retaining pin extending along a radial direction of the turbine ring, the at least one radial retaining pin being screwed into the support casing and coming to radially bear in said radial direction against a first lug of the two lugs of the at least one ring sector to retain the at least one ring sector in position, and an anti-rotation system adapted to rotationally lock the at least one radial retaining pin,
    wherein each radial retaining pin is screwed into a bush fitted in the support casing, and
    wherein each radial retaining pin is rotationally locked inside the bush by a radially-inserted split pin, which is disposed between the radial retaining pin and the bush.

2. The assembly as claimed in claim 1, wherein each radial retaining pin of the at least one radial retaining pin comprises at a periphery thereof at least one blind drill hole, which comprises a first tapped hole, extending in a longitudinal direction of the radial retaining pin of the at least one radial retaining pin so that the radially-inserted split pin is inserted in said first tapped hole between the radial retaining pin of the at least one radial retaining pin and the bush.

3. The assembly as claimed in claim 2, wherein each radial retaining pin of the at least one radial retaining pin comprises at the periphery a plurality of blind drill holes regularly distributed about a longitudinal axis of the radial retaining pin of the at least one radial retaining pin.

4. The assembly as claimed in claim 2, wherein each bush comprises a tapped bore for receiving the radial retaining pin of the at least one radial retaining pin, the tapped bore of each bush being provided with at least one second tapped hole extending in a longitudinal direction of the bush so that the radial retaining pin of the at least one radial retaining pin is screwed in said at least one second tapped hole.

5. The assembly as claimed in claim 1, wherein, for each ring sector of the at least one ring sector, the two lugs are each retained between the two flanges of the support casing by two axial pins of the axial pins, the two axial pins being circumferentially offset from one another, and with each axial pin of the two axial pins is associated a radial retaining pin of the at least one radial retaining pin coming to radially bear against a corresponding lug of the two lugs of the at least one ring sector plumb with the axial pin of the two axial pins.

6. The assembly as claimed in claim 1, wherein each radial retaining pin of the at least one radial retaining pin comprises a hexagon head recess to allow each radial retaining pin of the at least one radial retaining pin to be screwed into the bush.

7. The assembly as claimed in claim 1, wherein each bush is fitted in the support casing and retained in the support casing by interference fitting.

8. A turbomachine comprising the assembly as claimed in claim 1.

* * * * *